United States Patent
Young et al.

(10) Patent No.: US 6,917,465 B2
(45) Date of Patent: Jul. 12, 2005

(54) METHOD AND APPARATUS FOR ELECTRICALLY ISOLATING AN OPTICAL AMPLIFIER MODULE HOUSED IN A UNIVERSAL CABLE JOINT

(75) Inventors: Mark K. Young, Monmouth Junction, NJ (US); David S. DeVincentis, Flanders, NJ (US); Savino S. Camporeale, Cranbury, NJ (US); Stephen Arthur Hughes Smith, Chester (GB)

(73) Assignee: Red Sky Systems, Inc., So. Plainfield, NJ (US)

(*) Notice: Subject to any disclaimer, the term of this patent is extended or adjusted under 35 U.S.C. 154(b) by 0 days.

(21) Appl. No.: 10/715,330

(22) Filed: Nov. 17, 2003

(65) Prior Publication Data

US 2004/0196529 A1 Oct. 7, 2004

Related U.S. Application Data

(60) Provisional application No. 60/433,189, filed on Dec. 13, 2002.

(51) Int. Cl.⁷ ............................. H01S 3/00; G02B 6/36; H04J 14/02
(52) U.S. Cl. ......................... 359/333; 385/92; 398/105
(58) Field of Search ...................... 398/105; 359/341.1, 359/333; 385/135, 92

(56) References Cited

U.S. PATENT DOCUMENTS 4,679,250 A * 7/1987 Davis et al. ............... 398/105
4,962,445 A * 10/1990 Pelet et al. ................ 361/722
6,381,394 B1 * 4/2002 Cabrera et al. ........... 385/135
6,571,042 B1 * 5/2003 Kordahi ..................... 385/100
6,665,477 B2 * 12/2003 Toth et al. ................. 385/100

FOREIGN PATENT DOCUMENTS

WO    WO 03/030203 A1 * 4/2003

* cited by examiner

Primary Examiner—Mark Hellner
(74) Attorney, Agent, or Firm—Mayer Fortkort & Williams PC; Stuart H. Mayer, Esq.

(57) ABSTRACT

An optical amplifier module is provided that contains at least one optical amplifier. The module includes an internal housing having an outer dimension substantially equal to an outer dimension of an internal fiber splice housing of an undersea optical fiber cable joint. The internal housing includes a pair of opposing end faces each having a retaining element for retaining the internal housing within an outer housing of the undersea optical fiber cable joint. The internal housing also includes a sidewall interconnecting the opposing end faces, which extends between the opposing end faces in a longitudinal direction. The sidewall includes a receptacle portion having a plurality of thru-holes each being sized to receive a passive optical component employed in an optical amplifier. The module also includes at least one circuit board on which reside electronics associated with the optical amplifier. An isolated electrical path provides electrical power received from a conductor in at least one optical fiber cable to the at least one circuit board.

57 Claims, 8 Drawing Sheets

METHOD AND APPARATUS FOR ELECTRICALLY ISOLATING AN OPTICAL AMPLIFIER MODULE HOUSED IN A UNIVERSAL CABLE JOINT

STATEMENT OF RELATED APPLICATION

This application claims the benefit of priority to U.S. Provisional Patent Application No. 60/433,189, filed Dec. 13, 2002, entitled "Method And Apparatus For Electrically Isolating An Optical Amplifier Module Housed IN A Universal Cable Joint."

FIELD OF THE INVENTION

The present invention relates to the field of optical repeaters, and more particularly to an optical repeater employed in an undersea optical transmission system.

BACKGROUND OF THE INVENTION

In undersea optical transmission systems optical signals that are transmitted through an optical fiber cable become attenuated over the length of the cable, which may span thousands of miles. To compensate for this signal attenuation, optical repeaters are strategically positioned along the length of the cable.

In a typical optical repeater, the optical fiber cable carrying the optical signal enters the repeater and is coupled through at least one amplifier and various components, such as optical couplers and decouplers, before exiting the repeater. These optical components are coupled to one another via optical fibers. Repeaters are housed in a sealed structure that protects the repeaters from environmental damage. During the process of deployment, the optical fiber cable is coiled onto large drums located on a ship. Consequently, the repeaters become wrapped about the drums along with the cable. Due to the nature of the signals, and the ever increasing amount of information being transmitted in the optical fibers, repeaters are getting larger, and their increased length creates problems as they are coiled around a drum. Although the drums may be up to 9–12 feet in diameter, current repeaters may be greater than 5 feet in length, and, therefore, are not able to lie flat, or even substantially flat, along a drum. Tremendous stresses due to forces on the order of up to 100,000 pounds are encountered at the connection point between the repeater and the fiber optic cable to which it is attached, especially during paying out and reeling in of the cable. The non equi-axial loading across the cable may arise as a result of severe local bending that is imposed on the cable at its termination with the repeater. This loading would inevitably lead to failure of cable components at loads well below the tensile strength of the cable itself.

To prevent failure of the cable during deployment of the repeater, a bend limiter is often provided, whose purpose is to equalize the forces imposed on the cable. In addition, a gimbal may be provided at each longitudinal end of the repeater to which the bend limiting devices are attached. The gimbal provides free angular movement in two directions. The bend angle allowed by the gimbal between the repeater and bend limiting device further reduces the local bending that is imposed on the optical fiber cables.

The large physical size of conventional repeaters increases their complexity and cost while creating difficulties in their deployment.

SUMMARY OF THE INVENTION

In accordance with the present invention, an optical amplifier module is provided that contains at least one optical amplifier. The module includes an internal housing having an outer dimension substantially equal to an outer dimension of an internal fiber splice housing of an undersea optical fiber cable joint. The internal housing includes a pair of opposing end faces each having a retaining element for retaining the internal housing within an outer housing of the undersea optical fiber cable joint. The internal housing also includes a sidewall interconnecting the opposing end faces, which extends between the opposing end faces in a longitudinal direction. The sidewall includes a receptacle portion having a plurality of thru-holes each being sized to receive a passive optical component employed in an optical amplifier. The module also includes at least one circuit board on which reside electronics associated with the optical amplifier. An isolated electrical path provides electrical power received from a conductor in at least one optical fiber cable to the at least one circuit board.

In accordance with one aspect of the invention, the undersea optical fiber cable joint includes a pair of cable termination units in which end portions of optical fiber cables to be jointed are respectively retained. The retaining elements are each connectable to one of the cable termination units.

In accordance with another aspect of the invention, the conductor of each of the optical fiber cables to be jointed are in electrical contact with one of the retaining elements.

In accordance with another aspect of the invention, the isolated electrical path includes a power conductor located within the circuit board that is in electrical contact with one of the retaining elements.

In accordance with another aspect of the invention at least one voltage dropping element is provided for conveying a portion of voltage from the power conductor to the electronics associated with the optical amplifier.

In accordance with another aspect of the invention, the voltage dropping element is a zener diode.

In accordance with another aspect of the invention, the circuit board comprises a pair of circuit boards, and the isolated electrical path further includes at least one electrically conductive pin electrically connecting the power conductors of the pair of circuit boards.

In accordance with another aspect of the invention, the plurality of thru-holes laterally extend through the receptacle portion of the sidewall in the longitudinal direction.

In accordance with another aspect of the invention, the internal housing has a generally cylindrical shape. The receptacle portion of the sidewall has a curvature that defines a diameter of the cylindrical shape.

In accordance with another aspect of the invention, the undersea optical fiber cable joint is a universal joint for jointing optical cables having different configurations.

In accordance with another aspect of the invention, the universal joint includes a pair of cable termination units in which end portions of the optical cables to be jointed are respectively retained. The retaining elements are each connectable to one of the cable termination units.

In accordance with another aspect of the invention, the retaining elements each include a flange through which at least one optical fiber extending from the end portion of one of the optical cables extends into the internal housing.

In accordance with another aspect of the invention, the optical fiber storage area includes at least one optical fiber spool around which optical fiber can be wound.

In accordance with another aspect of the invention, the internal housing is formed from a pair of half units that each include one of the retaining elements.

In accordance with another aspect of the invention, the sidewall includes a pair of ribbed members extending longitudinally from the receptacle portion of the sidewall. The ribbed members each have a tension rod thru-hole extending laterally therethrough in the longitudinal direction for supporting a tension rod employed by the undersea optical fiber cable joint.

In accordance with another aspect of the invention, the outer dimension of the internal housing is less than about 15 cm×50 cm.

In accordance with another aspect of the invention, the outer dimension of the internal housing is about 7.5 cm×15 cm.

DETAILED DESCRIPTION

The present inventors have recognized that a substantially smaller repeater can be achieved by first reducing the length of the repeater so that the stresses placed upon it during its deployment are greatly reduced, thereby eliminating the need for gimbals. The elimination of the gimbals, in turn, allows further reductions in the dimensions of the repeaters.

The present inventors have further recognized that a repeater substantially reduced in size can be housed in a unit formed from off-the-shelf components that have been qualified for the undersea environment. In particular, the inventors have recognized that a housing conventionally used for interconnecting different undersea optical fiber cables can also be used as an ultra-small form-factor repeater housing. As discussed below, one such housing, commonly referred to as the Universal Joint, has become the defacto worldwide standard for maintaining submarine cables and has a lengthy history of successful deployment. The present invention thus provides a repeater that, because of its small size, is easily deployed and which is located in an economical, submarine qualified housing that is already well established in the undersea optical communications industry. Moreover, because the Universal Joint can interconnect different optical fiber cables, the repeater can be used to interface with a variety of cables and systems from different manufacturers.

Figure 1:
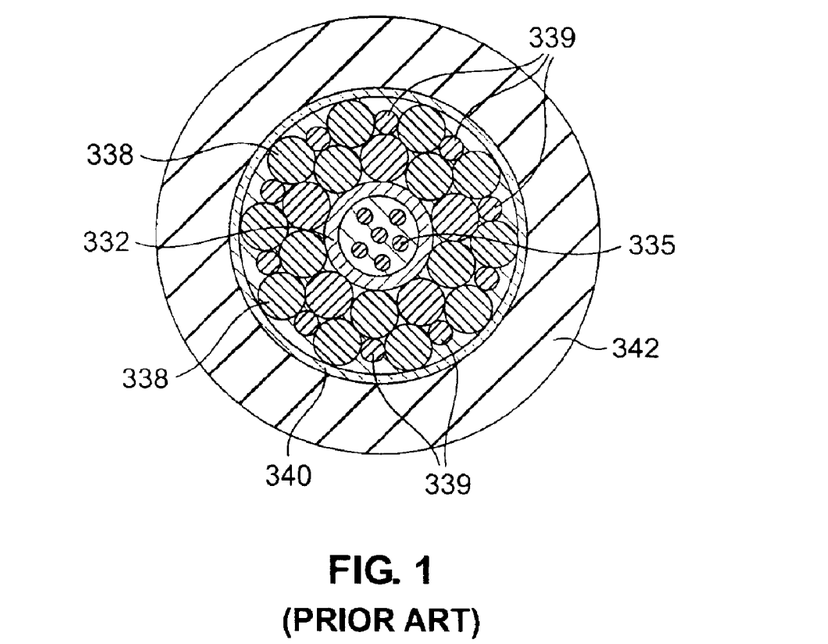
FIG. 1 shows an example of an undersea optical fiber cable.

To facilitate an understanding of the present invention, an example of an undersea optical fiber cable will be described in connection with FIG. 1. While different cable manufactures employ cables having different configurations and dimensions, most cables employ most of the components depicted in FIG. 1 in one form or the other. Optical cable 330 comprises a single, centrally located gel-filled buffer tube 332 made from a metal such as aluminum or stainless steel. The gel-filled buffer tube 332 contains optical fibers 335. In some cases the buffer tube 332 is replaced with a centrally disposed kingwire that is surrounded by optical fibers that are embedded in a polymer. Two layers of strandwires, which serve as strength members, are wound around the buffer tube. One layer includes strandwires 338 and the other layer includes strandwires 339. A copper conductor 340 surrounds the strandwires and serves as both an electrical conductor and a hermetic barrier. An outer jacket 342 formed from polyethylene encapsulates the copper conductor 340 and serves as an insulating layer.

Figure 2:
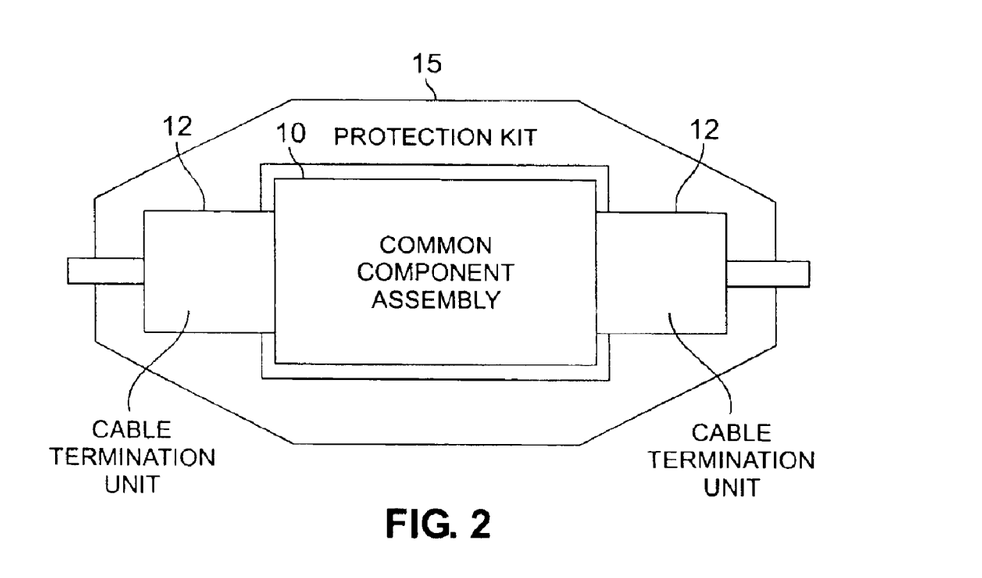
FIG. 2 shows a simplified schematic diagram of a universal cable joint for jointing fiber optic cables for use in undersea optical telecommunication systems.

FIG. 2 shows a simplified schematic diagram of a universal cable joint for jointing fiber optic cables for use in undersea optical telecommunication systems. Such a joint is referred to as a universal cable joint because it can interconnect many different types of undersea optical telecommunication cables, regardless of manufacturer. The cable joint includes a common component assembly 10 in which an optical fiber splice is located. The fiber splice is formed from two fibers that respectively originate in two cables that each terminate in cable termination units 12. A protective assembly 15 surrounds common component assembly 10 and cable termination units 12 to provide protection from the external environment.

Figure 3:
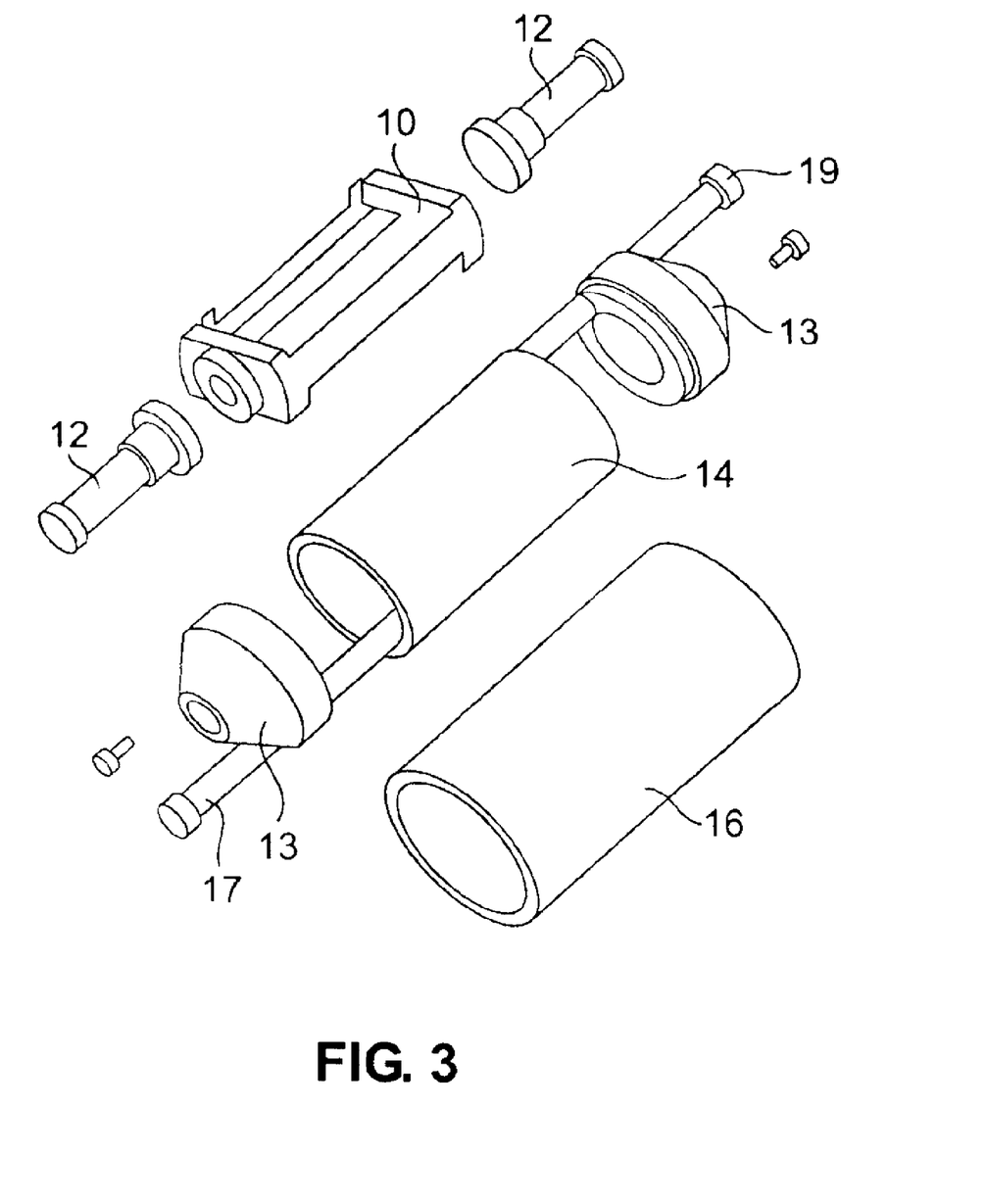
FIG. 3 shows a particular example of a universal cable joint that is available from Global Marine Systems Limited and the Universal Joint Consortium.

FIG. 3 shows a particular example of a universal cable joint that is available from Global Marine Systems Limited and the Universal Joint Consortium, which, as previously mentioned, is often simply referred to as the Universal Joint. In FIGS. 2 and 3, as well as the figures that follow, like reference numerals indicate like elements. In FIG. 3, the protective assembly 15 depicted in FIG. 2 comprises a stainless steel sleeve 14 that surrounds the common component assembly 10 and a polyethylene sleeve 16 that is molded over the common component assembly 10. The stainless steel sleeve 14 provides resistance to tensile, torsional and compressive loads and further provides an electrically conductive path through which electrical power can be transmitted from the copper conductor of one cable to the copper conductor of the other.

The jointing process begins by stripping back the various layers of the cable to reveal predetermined lengths of the outer jacket, copper conductor, strandwires, and the fiber package (e.g., the buffer tube containing the optical fibers or the kingwire surrounded by the optical fibers). The strandwires are clamped in a ferrule assembly located in the cable termination units 12. The fiber package extends into the common component assembly 10, where it is held in place by a series of clamps. In the common component assembly 10 the individual fibers are separated and spliced to their corresponding fibers from the other cable. The splices, along with excess fiber, are looped and wound in channels that are formed within the common component assembly 10. The common component assembly 10 is inserted in the stainless steel sleeve 14 and end caps 13 are screwed to each end of the assembly 10. Two tension rods 17 and 19 extend through the end caps 13 and the common component assembly 10. The tension rods 17 and 19 are designed to carry the tension loads that are placed on the universal joint during the deployment process as the joint is transferred from a ship to its undersea environment. Finally, the joint is laid in a mold that is injected with molten polyethylene to provide an insulate (i.e., polyethylene sleeve 16) that is continuous with the outer jacket of the cables.

The present inventors have recognized that a cable joint such as the universal cable joints depicted in FIGS. 2–3 can be modified to serve as a repeater housing in which 1 or more optical amplifiers are located. FIGS. 4–9 show one embodiment of an optical amplifier module 400 that replaces the common component assembly 10 seen in FIGS. 1–4. The optical amplifier module 400 must have substantially common component assembly, which is only about 7.5 cm×15 cm. As previously mentioned, this is far less in size than conventional repeater housings, which are often several feet in length. The optical amplifier module 400 depicted in the figures can support 4 erbium-doped fiber amplifiers (EDFAs), physically grouped as a dual amplifier unit for each of two fiber pairs. Of course, the present invention encompasses optical amplifier modules that can support any number EDFAs.

Each optical amplifier includes an erbium doped fiber, an optical pump source, an isolator and a gain flattening filter (GFF). The amplifiers are single-stage, forward pumped with cross-coupled pump lasers. A 3 dB coupler allows both coils of erbium doped fiber in the dual amplifier to be pumped if one of the two pump lasers fails. At the output, an isolator protects against backward-scattered light entering the amplifier. The gain flattening filter is designed to flatten the amplifier gain at the designed input power. An additional optical path may be provided to allow a filtered portion of the backscattered light in either fiber to be coupled back into the opposite direction, allowing for COTDR-type line-monitoring. Of course, optical amplifier module 400 may support EDFAs having different configurations such as multistage amplifiers, forward and counter-pumped amplifiers, as well as fiber amplifiers that employ rare-earth elements other than erbium.

The optical amplifier module 400 is designed to be compatible with the remainder of the cable joint so that it connects to the cable termination units 12 and fits within the stainless steel sleeve 14 in the same manner as the common component assembly 10.

Figure 4:
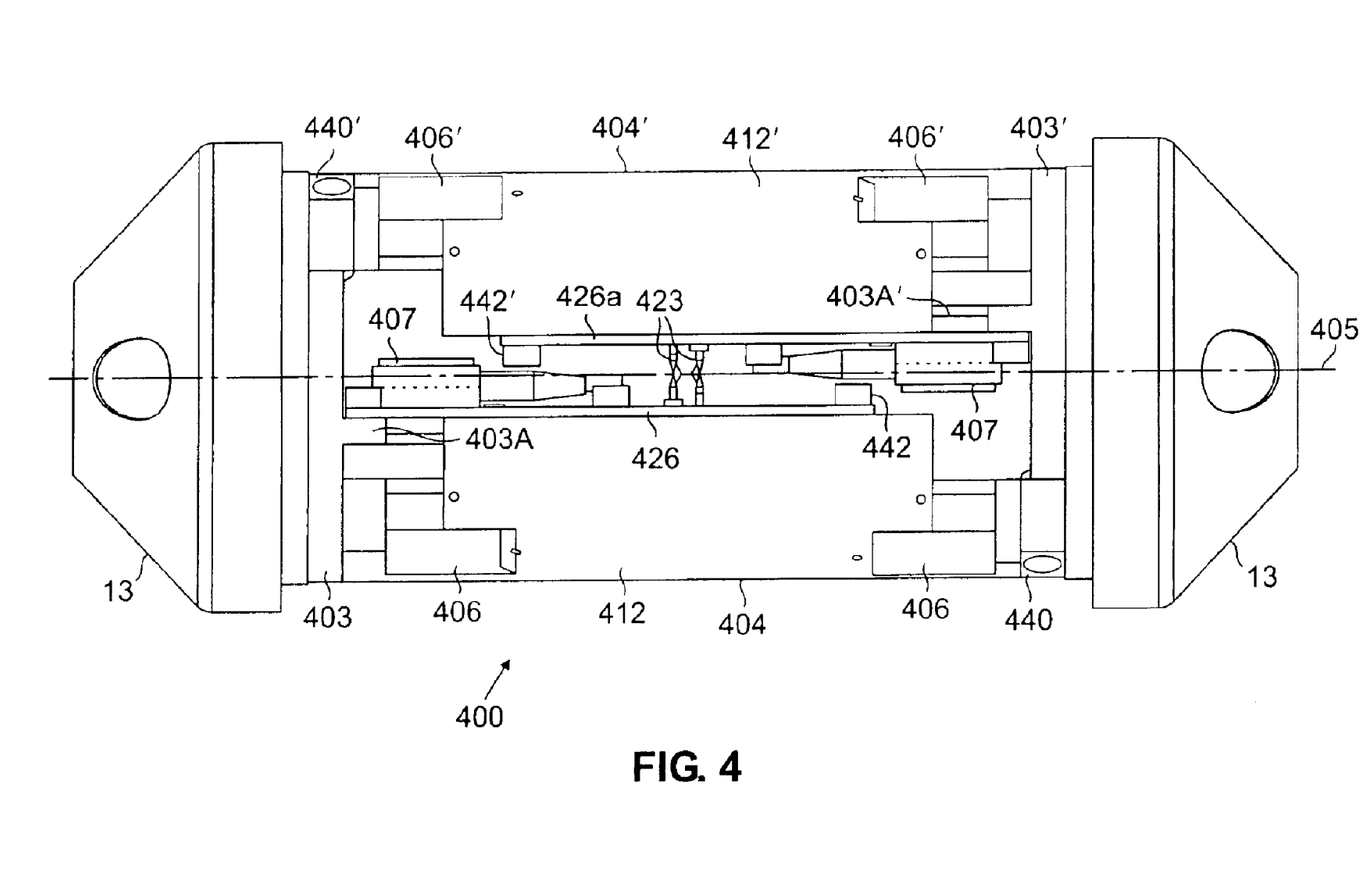
FIG. 4 shows a side view of an optical amplifier module constructed in accordance with the present invention.
Figure 5:
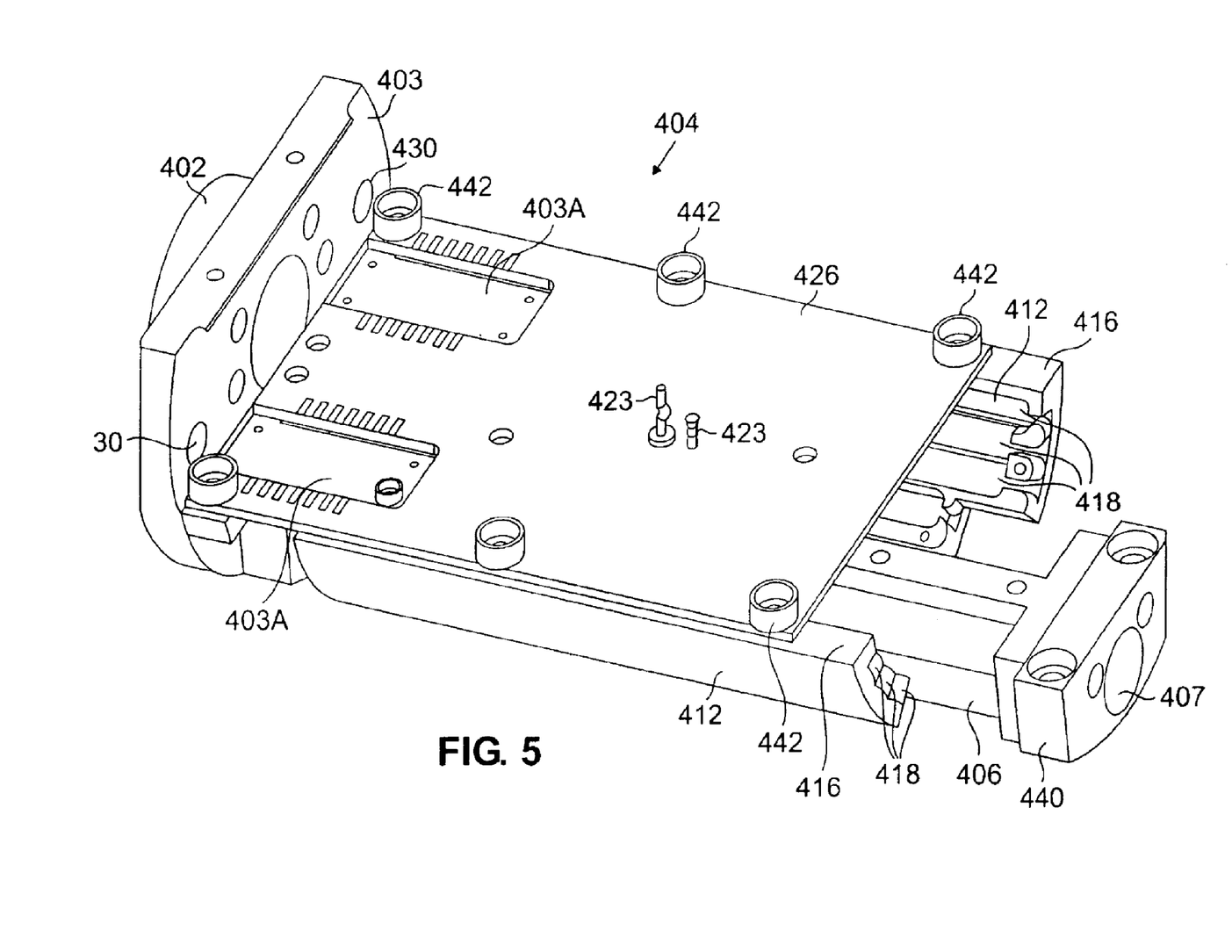
FIG. 5 shows a perspective view of one of the half units that form the optical amplifier module depicted in FIG. 4.

A side view of optical amplifier module 400 is shown in FIG. 4 with end caps 13 in place. The module 400 is defined by a generally cylindrical structure having flanges 402 (seen in FIG. 5) located on opposing end faces 403. A longitudinal plane 405 extends through the optical amplifier module 400 to thereby bisect the module 400 into two half units 404 and 404' that are symmetric about a rotational axis perpendicular to the longitudinal plane 405. That is, as best seen in FIG. 5, rather than dividing the end faces 403 into two portions located on different half units 404, each half unit 404 includes the portion of one of the end faces 403 on which a respective flange 402 is located. FIG. 5 shows a perspective view of one of the units 404. In the embodiment of the invention depicted in FIGS. 4–9, each half unit 404 houses two erbium-doped fiber amplifiers Flanges 402 mate with the cable termination units 12 of the Universal Joint shown in FIG. 3. As seen in the cross-sectional views of FIGS. 7 and 8, through-holes 407 extend inward from the end faces 403 through which the tension rod of the universal joint are inserted. The end faces 403 also include clearance holes 430 for securing the end caps 13 of the Universal Joint to the optical amplifier module 400. The clearance holes 430 are situated along a line perpendicular to the line connecting the tension rods thru-holes 407.

Figure 6:
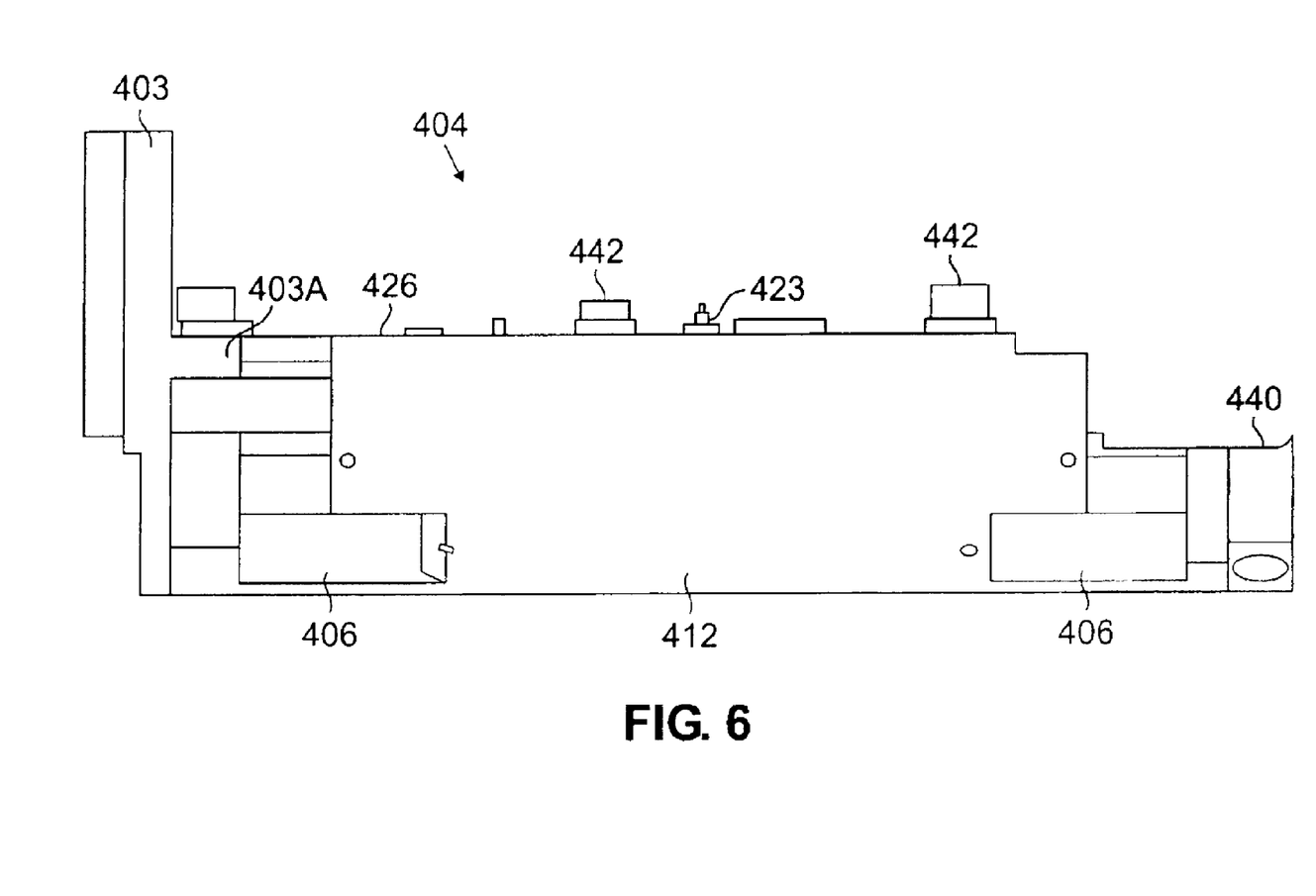
FIG. 6 shows a side view of one of the half units that form the optical amplifier module depicted in FIG. 4.
Figure 7:
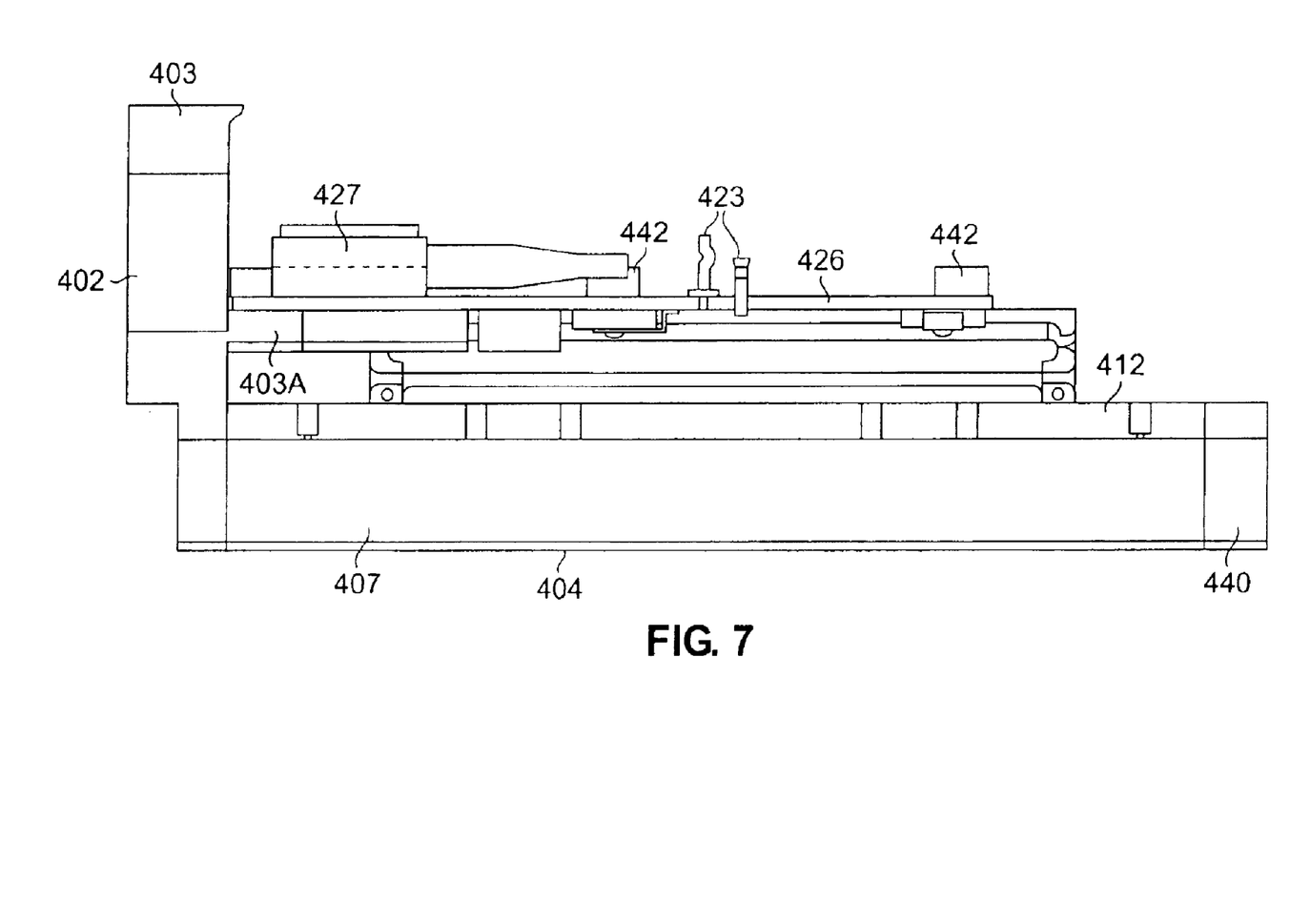
FIG. 7 shows a cross-sectional side view one of the half units that form the optical amplifier module depicted in FIG. 4.

As shown in FIGS. 4–6, each unit 404 includes curved sidewalls 412 forming a half cylinder that defines a portion of the cylindrical structure. A spinal member 406 is integral with and tangent to the curved sidewalls 412 and extends longitudinally therefrom. The thru hole 407 containing the tension rod of the universal joint extends through the spinal member 406. A ceramic boss 440 is located on the end of the spinal member 406 remote from the end flange 403. As shown in FIGS. 5 and 7, the thru hole 407 extends through the ceramic boss 440. As discussed below, the ceramic boss 440 prevents the flow of current from one half unit 404 to the other.

A circuit board support surface 416 extends along the periphery of the unit 404 in the longitudinal plane 405. Circuit board 426 is mounted on support surface 416. When the half units 404 and 404' are assembled, circuit boards 426 and 426' are interconnected by a pair of interlocking conductive power pins 423 that provide electrical connectivity between the two circuit boards 426 and 426'. The inner cavity of the unit 404 located between the circuit board support surface 416 and the spinal member 406 serves as an optical fiber storage area. Optical fiber spools 420 are located on the inner surface of the spinal member 406 in the optical fiber storage area. The erbium doped fibers, as well as any excess fiber, are spooled around the optical fiber spools 420. The optical fiber spools 420 have outer diameters that are at least great enough to prevent the fibers from bending beyond their minimum specified bending radius.

The curved sidewalls 412 are sufficiently thick to support a plurality of thru-holes 418 that extend therethrough in the longitudinal direction. The thru-holes 418 serve as receptacles for the passive components of the optical amplifiers. That is, each receptacle 418 can contain a component such as an isolator, gain flattening filter, coupler and the like.

End faces 403 each include a pair of pump support bosses 403a (see FIGS. 6 and 7) that extend inward and parallel to the circuit board 426. The circuit board 426 has cut-outs so that the pump support bosses 403a are exposed. A pump source 427 that provides the pump energy for each optical amplifier is mounted on each pump boss 403a.

Electrical Connectivity

As previously mentioned, electrical connectivity must be maintained between the cables in the two cable termination units 12. However, the various components in the optical amplifier module 400 must be electrically isolated to enable a small voltage (e.g., 5–20 v) that must be supplied to the electrical components located on the circuit boards 426.

Referring again to FIG. 3, the optical amplifier module 400 and sleeve 14 are surrounded by polyethylene sleeve 16, which serves as a dielectric. Electrical power is taken from the conductor in the cable located in the termination units 12 and transferred through a conductor located in the circuit board 426. The circuit board is electrically isolated from the optical amplifier module 400, with the epoxy resin of the circuit board acting as a local dielectric. After the voltage is dropped to the electrical components on one of the circuit boards the voltage is passed from circuit board 426 to circuit board 426' via a pair of complaint conductive pins 423 that each comprise a pin and socket assembly. The pins 423 allow for any axial movement that may occur as a result of tension or hydrostatic pressure.

Figure 8:
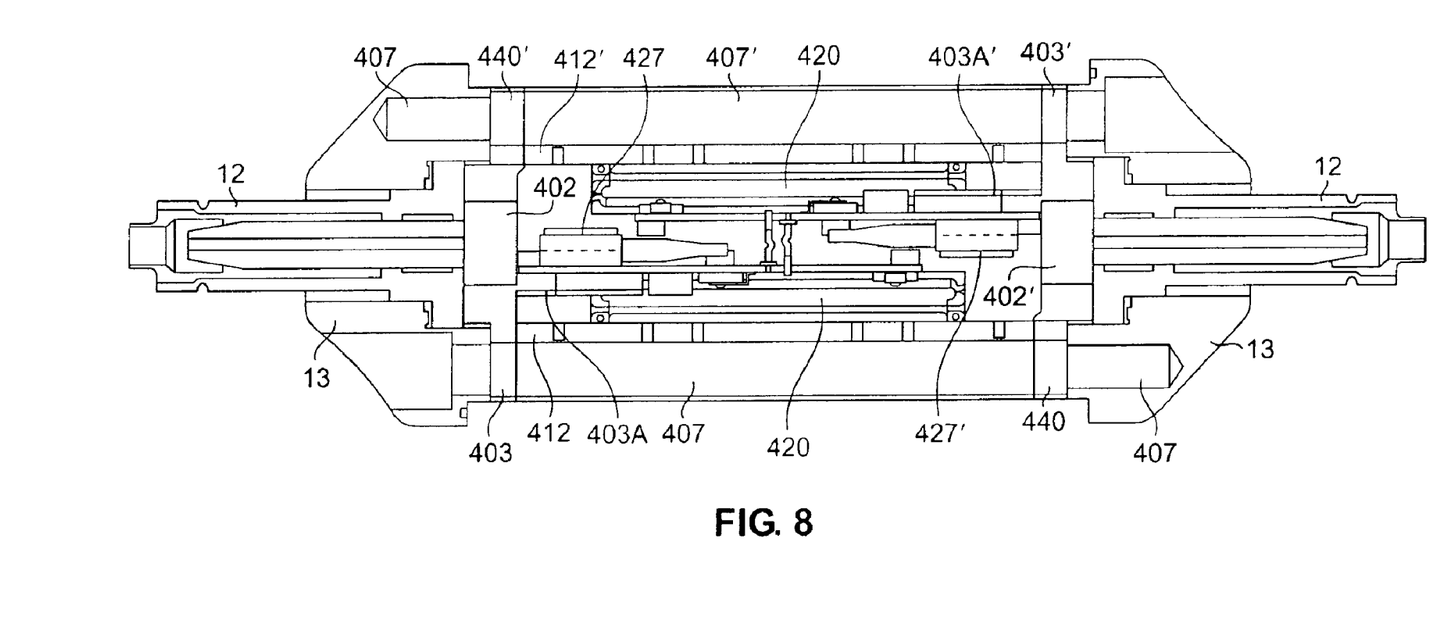
FIG. 8 is cross-sectional side view of the optical amplifier module shown in FIG. 4.

More specifically, with reference now to FIGS. 7 and 8, power is supplied to the electrical components as follows. Since the cable termination units 12 are electrically powered or active, end caps 13 are also electrically active. A power conductor extends within each of the circuit boards 426 and 426'. The power conductors receive electrical power directly from the pump support bosses 403*a*. One or more voltage dropping elements such as zener diodes are located on the circuit board 426. The zener diodes, which electrically couple the power conductors to the other electrical components on the circuit board, drop a voltage that is sufficient to power the electrical components. Electric connectivity extends along the power conductors and is maintained across the circuit boards to the other via the conductive pins 423. In this way electric conductivity extends from one end cap 13, through the end flange 403 and pump support boss 403*a* in contact with the end cap 13, through the power conductor located on the circuit board 426 resting on the pump support boss 403*a*, through one of the power pins 423 and through the power conductor located in the other circuit board 426. Finally, electrical conductivity extends to the other end cap 13 via the other pump support boss 403*a* and end flange 403.

The electrical path is isolated from the optical amplifier module 400 as follows. A thermal and electrically insulating pad is located between the circuit board support surface 416 and the circuit board 426. In this way the pump support boss 403*a* is electrically isolated from the circuit board 426, except through the aforementioned power conductor. Ceramic isolators 442 surround the bolts that secure the circuit board 426 to the sidewalls 412 of each half unit 404. The ceramic isolators 442 prevent electrical discharges from the bolts to the components located on the circuit board 426. The ceramic boss 440 located on each half unit 404 electrically isolates the spinal member 406 to which it is connected from both the end cap 13 and the end flange 403 with which it is in contact.

Figure 9:
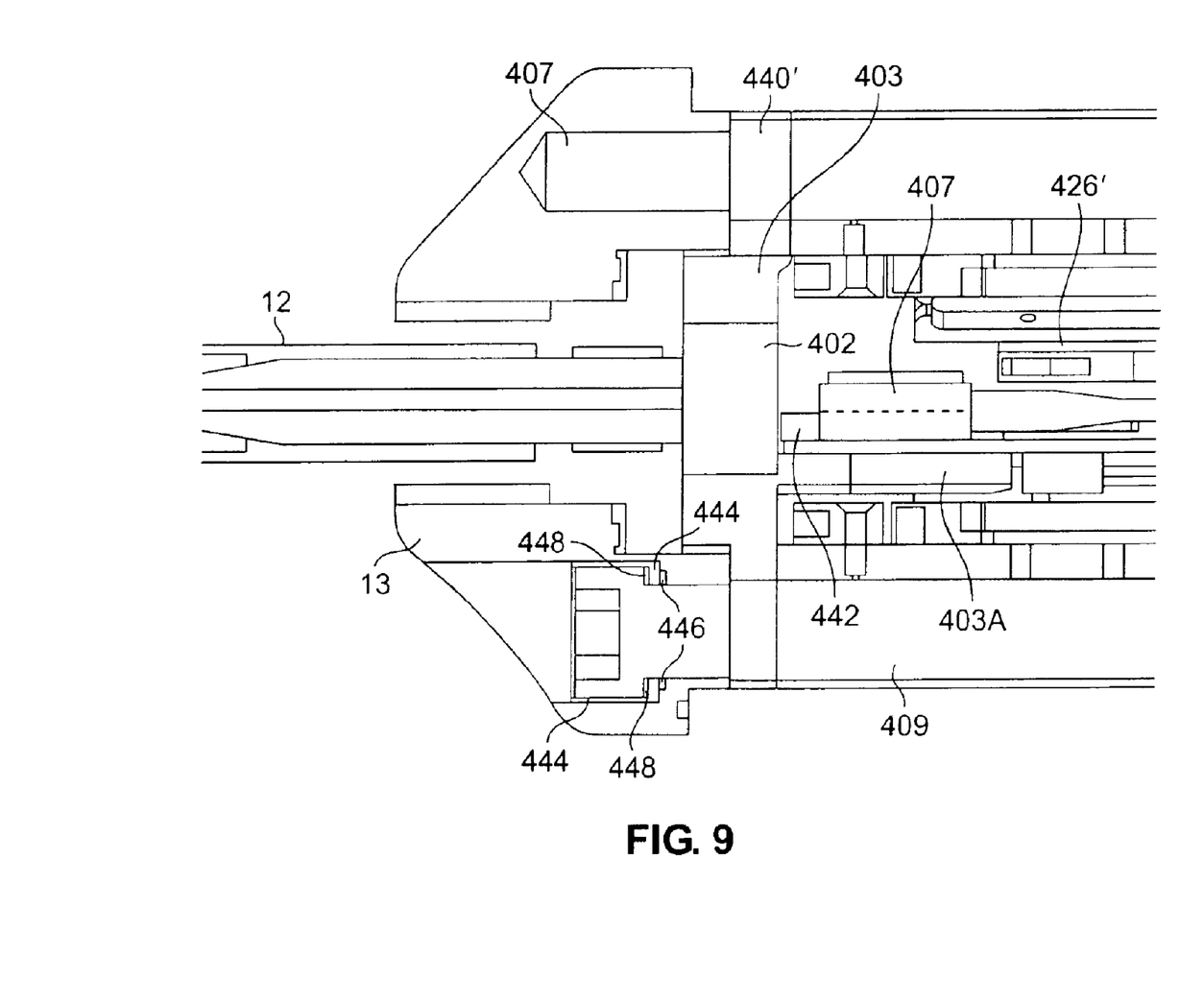
FIG. 9 is an enlarged, cross-sectional side view of the portion of the optical amplifier module that interconnects with the end cap.

FIG. 9 shows the manner in which the tension rods 409 extending through thru-holes 407 are electrically isolated from the end caps 13. As shown in FIG. 9 for the left-most end cap 13, a ceramic washer 444 surrounds the head of each tension rod 409. The ceramic washer 444 electrically isolates the end cap 13 from the tension rod 409. Because the seal established by the ceramic washer 444 is not hermetic, copper washers 446 and 448 are also provided to ensure that such a hermetic seal is achieved between the tension rod and the end cap 13. The threaded end of the tension rods 409 terminate in the opposing end cap 13 and the threaded ends are not electrically isolated from the end cap 13.

Since the sleeve 14 contacts the end caps 13, sleeve 14 should preferably be formed from a non-conductive material. For example, sleeve 14 may be formed from a thermally conductive ceramic, which is advantageous because of its strength. However, because such ceramics are often nominally electrically conductive they need to be provided with an oxide surface in order serve as a dielectric. The surface finish of the oxide is preferably polished to facilitate formation of a hermetic seal.

What is claimed is:

1. An optical amplifier module containing at least one optical amplifier, said module comprising:
    an internal housing having an outer dimension substantially equal to an outer dimension of an internal fiber splice housing of an undersea optical fiber cable joint, said internal housing including:
        a pair of opposing end faces each having a retaining element for retaining the internal housing within an outer housing of said undersea optical fiber cable joint;
        a sidewall interconnecting said opposing end faces and extending between said opposing end faces in a longitudinal direction, said sidewall including a receptacle portion having a plurality of thru-holes each being sized to receive a passive optical component employed in an optical amplifier;
    at least one circuit board on which reside electronics associated with the optical amplifier; and
    an isolated electrical path for providing electrical power received from a conductor in at least one optical fiber cable to the at least one circuit board.

2. The optical amplifier module of claim 1 wherein said undersea optical fiber cable joint includes a pair of cable termination units in which end portions of optical fiber cables to be jointed are respectively retained, said retaining elements each being connectable to one of the cable termination units.

3. The optical amplifier module of claim 2 wherein said conductor of each of the optical fiber cables to be jointed are in electrical contact with one of the retaining elements.

4. The optical amplifier module of claim 3 wherein said isolated electrical path includes a power conductor located within the circuit board that is in electrical contact with one of the retaining elements.

5. The optical amplifier module of claim 4 further comprising at least one voltage dropping element for conveying a portion of voltage from the power conductor to the electronics associated with the optical amplifier.

6. The optical amplifier module of claim 5 wherein said voltage dropping element is a zener diode.

7. The optical amplifier module of claim 4 wherein said at least one circuit board comprises a pair of circuit boards, and wherein said isolated electrical path further comprises at least one electrically conductive pin electrically connecting the power conductors of the pair of circuit boards.

8. The optical amplifier module of claim 1 wherein said plurality of thru-holes laterally extend through said receptacle portion of the sidewall in the longitudinal direction.

9. The optical amplifier module of claim 1 wherein said internal housing has a generally cylindrical shape, said receptacle portion of the sidewall having a curvature that defines a diameter of the cylindrical shape.

10. The optical amplifier module of claim 1 wherein the undersea optical fiber cable joint is a universal joint for jointing optical cables having different configurations.

11. The optical amplifier module of claim 1 wherein said retaining elements each include a flange through which at least one optical fiber extending from the end portion of one of the optical cables extends into the internal housing.

12. The optical amplifier module of claim 1 further comprising an optical fiber storage area located within said internal housing.

13. The optical amplifier module of claim 12 wherein said optical fiber storage area includes at least one optical fiber spool around which optical fiber can be wound.

14. The optical amplifier module of claim 1 wherein said internal housing is formed from a pair of half units that each include one of the retaining elements.

15. The optical amplifier module of claim 7 wherein said internal housing is formed from a pair of half units that each include one of the retaining elements.

16. The optical amplifier module of claim 15 wherein each circuit board is located in a different one of the half units.

17. The optical amplifier module of claim 1 wherein said sidewall includes a pair of ribbed members extending longitudinally from the receptacle portion of the sidewall, said ribbed members each having a tension rod thin-hole extending laterally therethrough in the longitudinal direction for supporting a tension rod employed by the undersea optical fiber cable joint.

18. The optical amplifier module of claim 1 wherein the outer dimension of the internal housing is less than about 15 cm×50 cm.

19. The optical amplifier module of claim 1 wherein the outer dimension of the internal housing is about 7.5 cm×15 cm.

20. In an external, hermetically sealed outer housing of an undersea optical fiber cable joint, an optical amplifier module comprising:
 a protective sleeve;
 an internal housing located in said protective sleeve, said internal housing including:
  a pair of opposing end faces each having a retaining element for retaining the internal housing within an outer housing of said undersea optical fiber cable joint; and
  a sidewall interconnecting said opposing end faces and extending between said opposing end faces in a longitudinal direction, said sidewall including a receptacle portion having a plurality of thru-holes each being sized to receive a passive optical component employed in an optical amplifier;
  at least one circuit board on which reside electronics associated with the optical amplifier; and
  an isolated electrical path for providing electrical power received from a conductor in at least one optical fiber cable to the at least one circuit board.

21. The optical amplifier module of claim 20 wherein said undersea optical fiber cable joint includes a pair of cable termination units in which end portions of optical fiber cables to be jointed are respectively retained, said retaining elements each being connectable to one of the cable termination units.

22. The optical amplifier module of claim 21 wherein said conductor of each of the optical fiber cables to be jointed are in electrical contact with one of the retaining elements.

23. The optical amplifier module of claim 22 wherein said isolated electrical path includes a power conductor located within the circuit board that is in electrical contact with one of the retaining elements.

24. The optical amplifier module of claim 23 further comprising at least one voltage dropping element for conveying a portion of voltage from the power conductor to the electronics associated with the optical amplifier.

25. The optical amplifier module of claim 24 wherein said voltage dropping element is a zener diode.

26. The optical amplifier module of claim 23 wherein said at least one circuit board comprises a pair of circuit boards, and wherein said isolated electrical path further comprises at least one electrically conductive pin electrically connecting the power conductors of the pair of circuit boards.

27. The optical amplifier module of claim 20 wherein said plurality of thru-holes laterally extend through said receptacle portion of the sidewall in the longitudinal direction.

28. The optical amplifier module of claim 20 wherein said internal housing has a generally cylindrical shape, said receptacle portion of the sidewall having a curvature that defines a diameter of the cylindrical shape.

29. The optical amplifier module of claim 20 wherein the undersea optical fiber cable joint is a universal joint for jointing optical cables having different configurations.

30. The optical amplifier module of claim 29 wherein said universal joint includes a pair of cable termination units in which end portion of the optical cables to be jointed are respectively retained, said retaining elements each being connectable to one of the cable termination units.

31. The optical amplifier module of claim 30 wherein said retaining elements each include a flange through which at least one optical fiber extending from the end portion of one of the optical cables extends into the internal housing.

32. The optical amplifier module of claim 20 further comprising an optical fiber storage area located within said internal housing.

33. The optical amplifier module of claim 30 wherein said optical fiber storage area includes at least one optical fiber spool around which optical fiber can be wound.

34. The optical amplifier module of claim 20 wherein said internal housing is formed from a pair of half units each including at least one of the retaining elements.

35. The optical amplifier module of claim 26 wherein said internal housing is formed from a pair of half units each including at least one of the retaining elements.

36. The optical amplifier module of claim 35 wherein each circuit board is located in a different one of the half units.

37. The optical amplifier module of claim 20 wherein said sidewall includes a pair of ribbed members extending longitudinally from the receptacle portion of the sidewall, said ribbed members each having a tension rod thru-hole extending laterally therethrough in the longitudinal direction for supporting a tension rod employed by the undersea optical fiber cable joint.

38. The optical amplifier module of claim 20 wherein the outer dimension of the internal housing is less than about 15 cm×50 cm.

39. The optical amplifier module of claim 20 wherein the outer dimension of the internal housing is about 7.5 cm×15 cm.

40. An undersea optical repeater, comprising:
 an external, hermetically sealed outer housing of an undersea optical fiber cable joint, an optical amplifier module comprising:
  a protective sleeve located in said outer housing;
  an internal housing located in said protective sleeve, said internal housing including:
   a pair of opposing end faces each having a retaining element for retaining the internal housing within an outer housing of said undersea optical fiber cable joint; and
   a sidewall interconnecting said opposing end faces and extending between said opposing end faces in a longitudinal direction, said sidewall including a receptacle portion having a plurality of thin-holes each being sized to receive a passive optical component employed in an optical amplifier;
   at least one circuit board on which reside electronics associated with the optical amplifier; and
   an isolated electrical path for providing electrical power received from a conductor in a pair of optical fiber cables to the at least one circuit board.

41. The undersea optical repeater of claim 40 further comprising a pair of cable termination units in which end portions of the optical fiber cables to be jointed are respectively retained, said retaining elements each being connected to one of the cable termination units.

42. The undersea optical repeater of claim 40 wherein said conductor of each of the optical fiber cables to be jointed are in electrical contact with one of the retaining elements.

43. The undersea optical repeater of claim 41 wherein said conductor of each of the optical fiber cables to be jointed are in electrical contact with one of the retaining elements.

44. The undersea optical repeater of claim 42 wherein said isolated electrical path includes a power conductor located within the circuit board that is in electrical contact with one of the retaining elements.

45. The undersea optical repeater of claim 44 further comprising at least one voltage dropping element for conveying a portion of voltage from the power conductor to the electronics associated with the optical amplifier.

46. The undersea optical repeater of claim 45 wherein said voltage dropping element is a zener diode.

47. The undersea optical repeater of claim 40 wherein said at least one circuit board comprises a pair of circuit boards, and wherein said electrical path further comprises at least one electrically conductive pin electrically connecting the power conductors of the pair of circuit boards.

48. The undersea optical repeater of claim 40 wherein said plurality of thru-holes laterally extend through said receptacle portion of the sidewall in the longitudinal direction.

49. The undersea optical repeater of claim 40 wherein said internal housing has a generally cylindrical shape, said receptacle portion of the sidewall having a curvature that defines a diameter of the cylindrical shape.

50. The undersea optical repeater of claim 40 wherein the undersea optical fiber cable joint is a universal joint for jointing optical cables having different configurations.

51. The undersea optical repeater of claim 40 wherein said retaining elements each include a flange through which at least one optical fiber extending from the end portion of one of the optical fiber cables extends into the internal housing.

52. The undersea optical repeater of claim 40 further comprising an optical fiber storage area located within said internal housing.

53. The undersea optical repeater of claim 52 wherein said optical fiber storage area includes at least one optical fiber spool around which optical fiber can be wound.

54. The undersea optical repeater of claim 40 wherein said sidewall includes a pair of ribbed members extending longitudinally from the receptacle portion of the sidewall, said ribbed members each having a tension rod thru-hole extending laterally therethrough in the longitudinal direction and further comprising a tension rod extending through one of the tension rod thru-holes and each of the end faces.

55. The undersea optical repeater of claim 54 wherein the tension rods are each electrically isolated from at least one of the end faces.

56. The undersea optical repeater of claim 40 wherein the outer dimension of the internal housing is less than about 15 cm×50 cm.

57. The undersea optical repeater of claim 40 wherein the outer dimension of the internal housing is about 7.5 cm×15 cm.

* * * * *